(12) United States Patent
Yano et al.

(10) Patent No.: US 6,750,774 B2
(45) Date of Patent: Jun. 15, 2004

(54) RIDING DETECTION DEVICE FOR SEAT

(75) Inventors: Kengo Yano, Saitama (JP); Tadashi Onozuka, Saitama (JP); Yuji Ono, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 102 days.

(21) Appl. No.: 09/907,749

(22) Filed: Jul. 19, 2001

(65) Prior Publication Data

US 2002/0030601 A1 Mar. 14, 2002

(30) Foreign Application Priority Data

Jul. 19, 2000 (JP) ........................................ 2000-219631

(51) Int. Cl.[7] ................................................ G08B 21/00
(52) U.S. Cl. ...................... 340/667; 340/666; 200/85 A
(58) Field of Search ................................. 340/667, 665, 340/666; 200/85 R, 85 A; 307/9.1; 180/273; 297/195.1, 195.12, 423.17, DIG. 1

(56) References Cited

U.S. PATENT DOCUMENTS

| | | | | |
|---|---|---|---|---|
| 4,125,285 A | * | 11/1978 | Hanagan | ...................... 297/195 |
| 4,700,795 A | * | 10/1987 | Yashima et al. | ............ 180/68.5 |
| 5,161,820 A | * | 11/1992 | Vollmer | ...................... 280/730 |
| 5,594,411 A | | 1/1997 | Ono | ......................... 340/425.5 |
| 5,896,090 A | * | 4/1999 | Okada et al. | ................ 340/667 |
| 6,271,760 B1 | * | 8/2001 | Watanable et al. | ........... 340/667 |

FOREIGN PATENT DOCUMENTS

| | | |
|---|---|---|
| JP | 1-028086 A | 1/1989 |
| JP | 2-081774 A | 3/1990 |
| JP | 3-295777 A | 12/1991 |
| JP | 7-121711 | 12/1995 |

* cited by examiner

*Primary Examiner*—Toan Pham
(74) *Attorney, Agent, or Firm*—Birch, Stewart, Kolasch & Birch, LLP

(57) ABSTRACT

In view of a possibility that a conventional structure which mounts a pressure-sensitive riding detection sensor on a seat bottom plate and mounts a seat cushion on the riding detection sensor lowers the sensitivity of the riding detection sensor, the present invention arranges the riding detection sensor such that the riding detection sensor can have favorable sensitivity. A lower seat cushion is arranged on a seat bottom plate of a seat, and a seat switch is supported on the lower seat cushion. A seat cushion body which is made thin by the thickness of the lower seat cushion is mounted on the seat switch, and a seat skin covers an upper surface of the seat cushion body.

21 Claims, 4 Drawing Sheets

RIDING DETECTION DEVICE FOR SEAT

BACKGROUND OF THE INVENTION

1. Field of the Invention

The present invention relates to a riding detection device for a seat of a motorcycle or the like, and more particularly, to a structural arrangement which is advantageous for improving the sensitivity of the riding detection device.

2. Description of the Background Art

In Japanese Examined Patent Publication 121711/1995, there is disclosed a structure which constitutes a seat of a motorcycle or the like using a seat bottom plate, a seat cushion mounted on the seat bottom plate and a seat skin which covers the seat cushion. In this structure, a pressure-sensitive riding detection sensor is mounted on a central portion of the seat bottom plate. A rider riding on the seat is detected by this riding detection sensor when the rider sits on the seat.

In the above-mentioned structure, the riding detection sensor is mounted on the seat bottom plate and the thick seat cushion is mounted on the riding detection sensor and hence, the seating weight of the rider is absorbed by the thick seat cushion. Accordingly, there is a possibility that the sensitivity of the riding detection sensor is lowered. Further, since the seat bottom plate is required to have high-rigidity, when the seat bottom plate is made of resin or the like, a large number of ribs are generally formed on the seat bottom plate so that it is difficult to ensure a planar portion on which the riding detection sensor is arranged.

However, when the riding detection sensor is arranged immediately below the seat skin, for example, for the purpose of simply enhancing the sensitivity, it provides a rugged feeling to the rider and hence, the original function of the seat to provides a comfortable feeling to the rider is spoiled. Further, the riding detection sensor is required to barely respond to a weight other than the seating weight of the rider, such as the weight of luggage. Still further, the riding detection sensor is required to surely respond to the seating weight of the rider irrespective of a difference in the physical structure of the rider. The present invention aims at the realization of these demands.

SUMMARY OF THE INVENTION

To solve the above-mentioned problems, a riding detection device for a seat according to the present invention has a seat for a vehicle which includes a seat bottom plate, a seat cushion mounted on the seat bottom plate, and a seat skin covering a surface of the seat cushion, wherein a riding detection sensor is arranged at an intermediate portion in a vertical direction of the seat cushion.

Here, sensor supporting protrusions are formed on a portion of the seat cushion for supporting the riding detection sensor, and the riding detection sensor is supported on the sensor supporting protrusions. Further, the riding detection sensor is arranged so as to be extended in the forward and rearward directions at a central portion in the widthwise direction of the seat, and the riding detection sensor has a portion thereof disposed frontward from a hip point of a rider on the seat, elongated more. The upward and downward direction, the widthwise direction and the frontward and rearward direction of the seat cushion are determined by employing the use state of the seat as the reference.

The riding detection sensor according to the present invention is arranged at the intermediate portion in the vertical direction of the seat cushion and hence, the sensitivity to the seating weight of a rider can be enhanced and, at the same time, the feeling of the seat to the rider can be maintained in a favorable condition. Further, unlike the case of the seat bottom plate, it becomes easy to ensure a planar portion for arranging the riding detection sensor thereon so that the degree of freedom in the arrangement of the riding detection sensor can be increased.

Further, by providing the protrusions to a contact portion of the seat cushion where the seat cushion and the riding detection sensor come into contact with each other, the adjustment of the sensitivity is facilitated. Still further, by arranging the riding detection sensor such that the riding detection sensor is extended in the forward and rearward direction at a central portion in the widthwise direction of the seat and the riding detection sensor has the portion thereof disposed forwardly of the hip point of a rider, elongated more, even when there exists a difference in the physical structure of the rider, the seating portion is positioned above the riding detection sensor so that it becomes possible to make the sensitivity of the riding detection sensor barely respond to a weight other than the seating weight of the rider whereby the reliability of the riding detection sensor can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
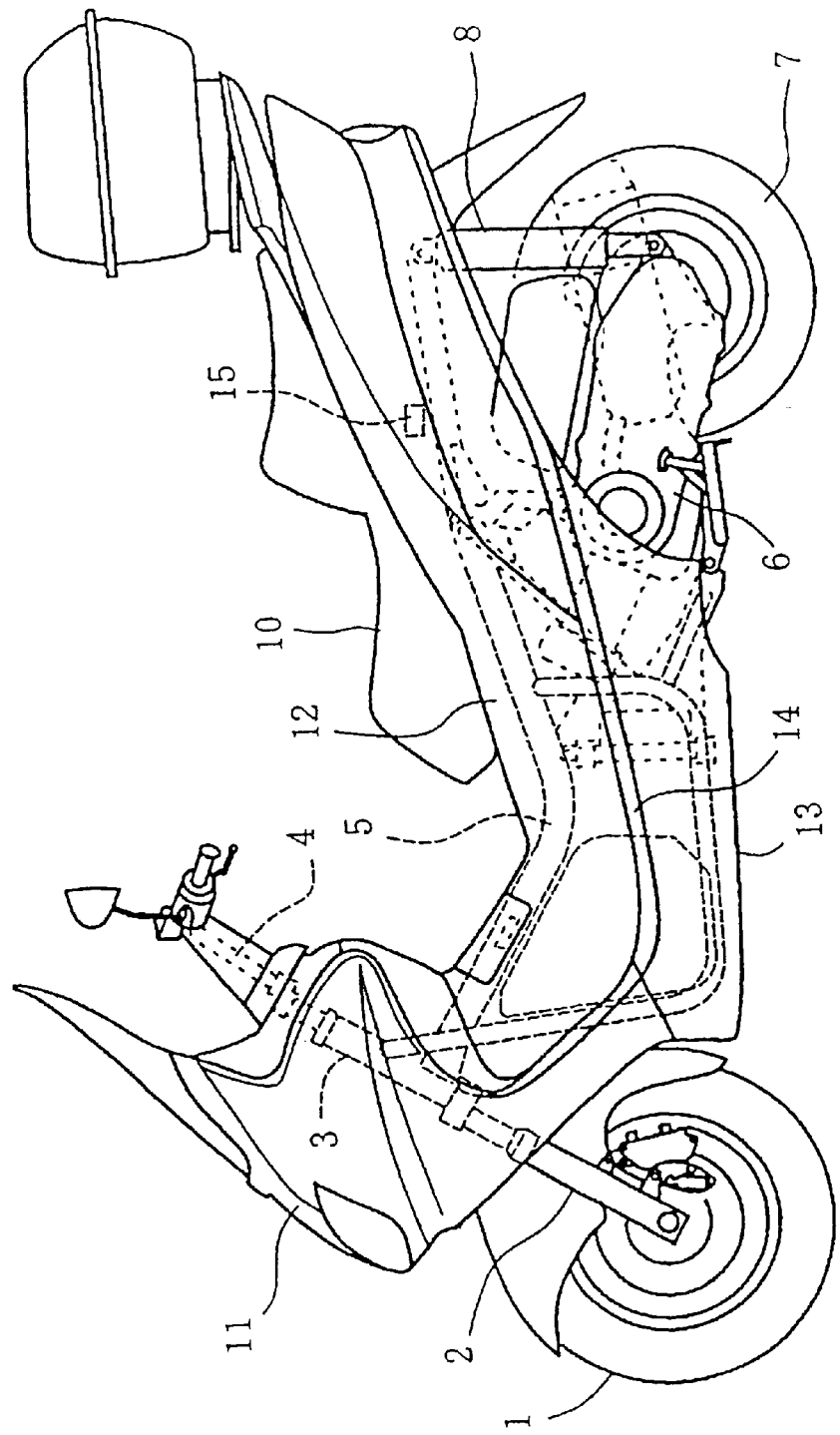
FIG. 1 is an overall side view of a motorcycle applied to this embodiment.

One embodiment of the present invention will now be explained with reference to the drawings. As shown in FIG. 1, the body of a motorcycle includes a pair of left and right front forks 2 which support a front wheel 1 at lower ends thereof. The forks 2 are rotatably supported on a head pipe 3 and are steered by a handle 4. A body frame 5 extends from the head pipe 3 to the rear portion of the body of the motorcycle, and a swing-type power unit 6 is tiltably supported on an intermediate portion of the body frame 5.

A rear wheel 7 is supported on a rear-end portion of the swing-type power unit 6. A rear cushion 8 for suspension is provided between respective rear end portions of the swing-type power unit 6 and the body frame 5. A seat 10 is supported on the body frame 5 above the swing-type power unit 6. The body of the motorcycle has a front portion thereof covered with a front cover 11, upper sides of left and right sides thereof covered with a side cover 12, and a lower portion thereof covered with a lower cover 13. A step floor 14 is formed on a joining portion of the side cover 12 and the lower cover 13 at the front portion of the seat 10.

This motorcycle is provided with an idle stop system which detects the presence of a rider with the use of a seat switch provided to the seat 10, and performs a control at the time of idling to an engine of the swing-type power unit 6. A controller 15 for controlling this idle stop system is provided at a suitable position of the body side. The illustration is an example thereof.

Referring now to FIGS. 2–5, the seat 10 is a double seat which is elongated in the front-to-back directions. The seat 10 is provided with a front seat 20 for a driver and a rear seat 16 for another occupant. The seat 10 is designed to be opened and closed in a lateral direction with a hinge 22 provided at a central lower portion in the front-to-back directions at the right side of the body of the motorcycle.

Figure 2:
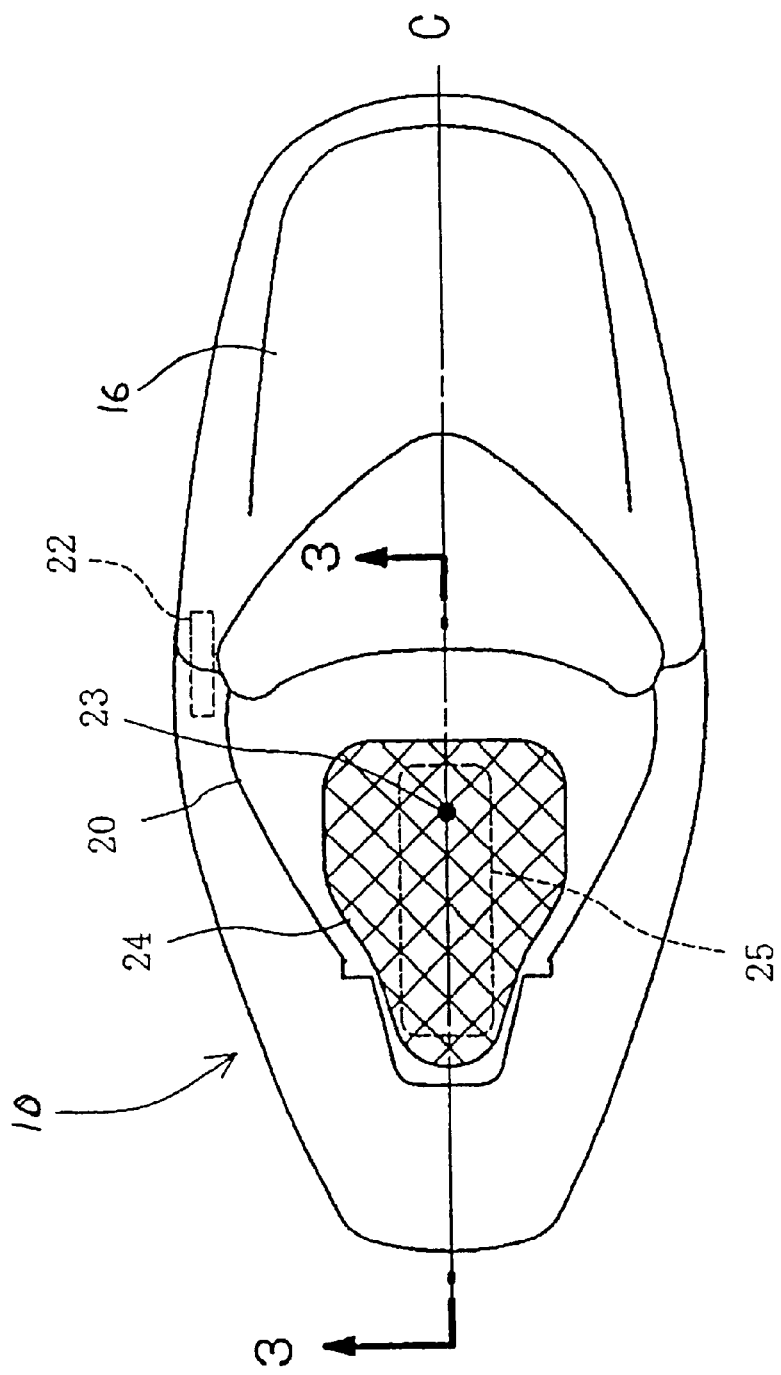
FIG. 2 is a plan view of a seat according to this embodiment.

As shown in FIG. 2, a hip point 23 is set at a position which is disposed at a central portion in the width direction of the front seat 20 and close to a rear portion of the front seat 20 with an occupant having the standard physical structure as the reference. A given range which surrounds this hip point 23 and is indicated by a hatching in FIG. 2 defines a seating area 24, and this seating area 24 is set at the central portion of the front seat 20.

A seat switch 25 which constitutes an example of the riding detection sensor which is elongated in the frontward and backward directions is arranged on the center C of the body which passes the hip point 23. The seat switch 25 is arranged along the center C of the body which passes the hip point 23 such that the seat switch 25 falls within the seating area 24. The seat switch 25 has a rear end thereof disposed at a position slightly behind the hip point 23 and a front end side thereof disposed at a position considerably displaced in the frontward direction from the hip point 23.

Figure 3:
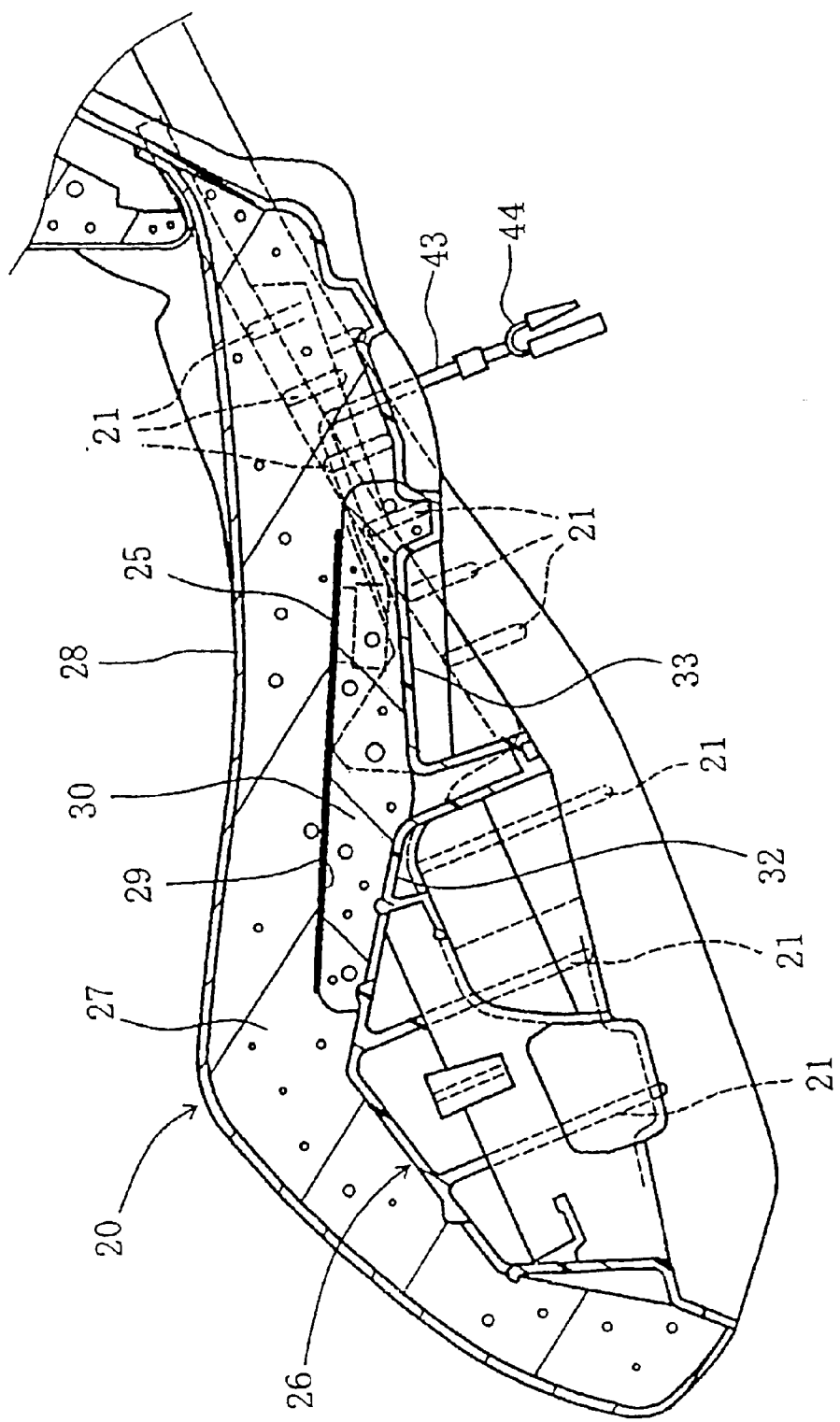
FIG. 3 is a cross-sectional side view in the forward and rearward direction of a front portion of the above seat.

As shown in FIG. 3, the front seat 20 includes a rigid seat bottom plate 26, a seat cushion body 27 which is mounted on the seat bottom plate 26, and a seat skin 28 which covers a surface side of the seat cushion body 27. The rear seat 16 is similarly formed. In the front seat 20, particularly in the central bottom portion of the seat cushion body 27, a cut portion 29 is formed by cutting the central bottom portion in an approximately horizontal direction. A lower seat cushion 30 which is prepared as a separate body is arranged between this cut portion 29 and the seat bottom plate 26 and the seat switch 25 is arranged between an upper surface of this lower seat cushion 30 and the cut portion 29. That is, the seat switch 25 is adhered to the cut portion 29 side of the seat cushion body 27, and the lower seat cushion 30 is assembled below the seat switch 25.

The seat bottom plate 26 is formed of a suitable resin such as polypropylene or the like and is capable of obtaining a given rigidity with the use of a large number of ribs 21. The front seat 20 portion is provided with a frontward rising inclined portion 32 which supports the front side of the bottom portion of the lower seat cushion 30, and a slightly and gently rearward rising inclined portion 33 which supports the rear side of the bottom portion of the lower seat cushion 30.

Figure 5:
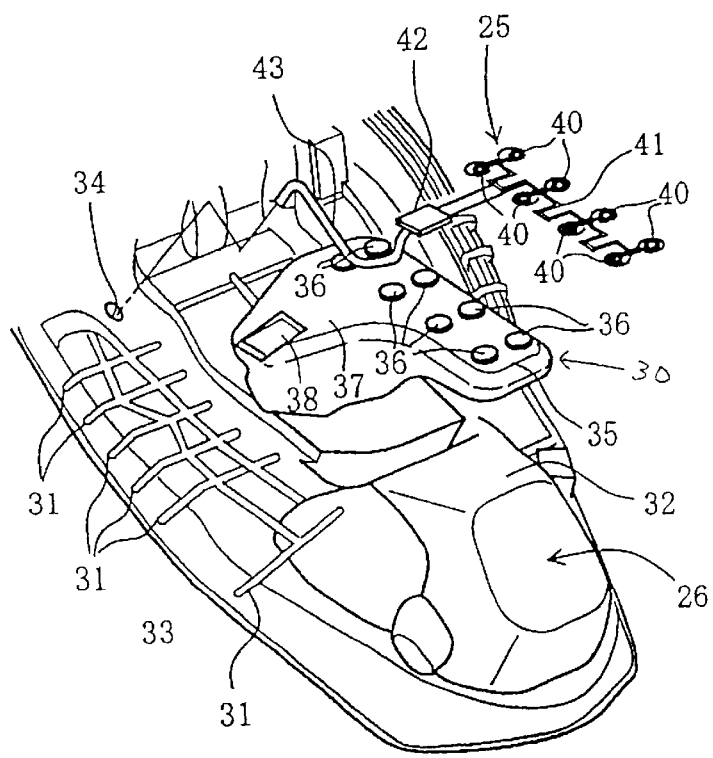
FIG. 5 is a view showing the inner structure of the front portion.

The lower seat cushion 30 is formed of suitable sponge-like material such as polyurethane foam such that the side cross section has an approximately triangular shape as shown in FIG. 3. As shown in FIG. 5, the lower seat cushion 30 has an upper surface portion thereof formed into a flat-plate portion 35 which is elongated in the frontward and backward direction and has an approximately rectangular shape in a plan view. Further, on this flat plate portion 35, sensor supporting protrusions 36 are formed with a suitable gap therebetween, wherein the sensor supporting protrusions 36 are integrally formed with the flat plate portion 35 in a boss shape such that these protrusions 36 are protruded upwardly. The flat plate portion 35 forms a frontward and gently rising inclined surface extending in the frontward and backward direction along the center C of the body (FIG. 3).

Further, as can be seen in FIG. 5, an overhang portion 37 which overhangs toward the right side of the body of the motorcycle is integrally formed on the rear half portion side of the flat plate portion 35 which supports the seat switch 25. This overhang portion 37 has an inclined surface which is descended toward the right side of the body. A recessed portion 38 is formed in the right end side of the upper surface of the overhang portion 37. Here, the lower seat cushion 30 exhibits an approximately L shape in a plan view due to the flat plate portion 35 and the overhang portion 37.

A through hole 34 extending in the vertical direction is formed in the seat bottom plate 26 at the right side portion of the body of the motorcycle which is disposed close to the rear portion of the overhang portion 37. The position of the through hole 34 is disposed in the vicinity of the hinge 22 (FIG. 2).

The seat switch 25 is provided with a plurality of body portions 40, wiring 41, and a connector 42 which connect these body portions 40. The body portions 40 are formed such that upon receiving a given seating weight, they are resiliently deformed to turn ON (or OFF) an inner switch. These body portions are respectively supported on the sensor supporting protrusions 36. The connector 42 is accommodated in the recessed portion 38 of the overhang portion 37.

A cord 43 extends from the switch portion 42 to the rear portion of the lower seat cushion 30 and reaches the backside of the seat bottom plate 26 after passing through the through hole 34. Here, the cord 43 reaches a controller 19 with the use of wiring inside the body (not shown) through a connector 44 (FIG. 3).

The seat cushion body 27 forms a main portion which supports the seating weight of the rider on the seat 10 and constitutes the seat 10 together with the lower seat cushion 30. The seat cushion body 27 and the lower seat cushion 30 are respectively made of suitable sponge-like material such as polyurethane foam and the seat cushion body 27 can realize a given hardness to the seat 10 as a whole together with the lower seat cushion 30. Further, the seat cushion body 27 also constitutes a member which properly reduces the seating weight applied to the lower seat cushion 30 and the seat switch 25 and simultaneously holds the seat switch 25.

Figure 4:
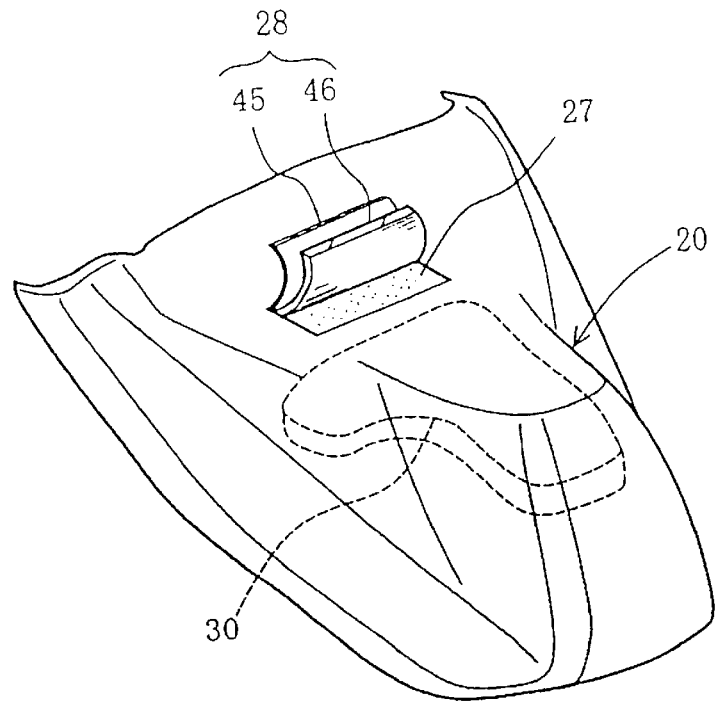
FIG. 4 is a perspective view of the front portion of the above seat.

As shown in FIG. 4, the seat skin 28 includes a topcoat 45 made of vinyl chloride leather or the like, and a waterproof cover 46 made of suitable material having waterproof characteristics such as polyethylene which is overlapped to the backside of the topcoat 45. The waterproof cover 46 prevents the intrusion of rain into the seat cushions 27, 30 and the seat switch 25.

The manner of operation of this embodiment will now be explained. When the rider sits on the front seat 20, the seating weight is transmitted from the seat cushion body 27 to the seat switch 25. At this time, the thickness of the seat cushion body 27 on the seat switch 25 is made thin by the thickness of the lower seat cushion 30 disposed below the seat switch 25. The lower seat cushion 30 which supports the seat switch 25 upon receiving the seating weight is also deformed together with the seat cushion body 27.

Accordingly, even when the seat cushion body 27 is disposed above the seat switch 25, the seat switch 25 is surely resiliently deformed to maintain its favorable sensitivity. Further, even when such sensitivity is maintained, due to the presence of the seat cushion body 27 above the seat switch 25, the feeling of the seat to the rider at the front seat 20 can maintain the favorable state which ensures the proper softness.

Further, due to the presence of the seat cushion body 27 and the lower seat cushion 30, the seating weight applied to the seat switch 25 is attenuated and hence, the seat switch 25 can be protected. Further, since the seat switch 25 is supported on the flat plate portion 35 of the lower seat cushion 30, a planar portion having the area necessary for supporting the seat switch 25 can be relatively easily ensured.

Accordingly, even when the mounting area of the seat switch 25 is large as a whole, the seat switch 25 can be easily arranged, thus increasing the degree of freedom of mounting. Further, since the body portions 40 of the seat switch 25 are arranged to be supported on the sensor supporting protrusions 36, by adjusting a protruding amount or the size of the sensor supporting protrusions 36, the sensitivity of the seat switch 25 can be arbitrarily adjusted.

Further, since the seat switch 25 is arranged so as to be disposed at the central portion in the motorcycle width direction of the front seat 20 and has the front side thereof elongated more from the hip point 23, even when a rider having a different physical structure sits on the seat, the seat switch 25 within the seating area 24 can respond so that the influence to the sensitivity due to the difference of the physical structure can be reduced and the reliability of the seat switch 25 as the riding detection device can be enhanced. Further, by arranging the seat switch 25 at the central portion in the motorcycle width direction, it becomes possible to make the seat switch 25 barely respond to a weight other than the weight of the rider such as the weight of luggage.

Still further, by pulling out the cord 43 downwardly through the through hole 34 in the vicinity of the hinge 22, it becomes possible to wire the cord 43 such that the presence of the cord 43 does not hamper the opening/closing of the seat 10 so that the cord 43 can be wired in an inconspicuous manner, thus maintaining a favorable appearance.

Here, the present invention is not limited to the above-mentioned embodiment and various modifications and applications are possible within the principle of the present invention. For example, the sensor supporting protrusions 36 may be protruded not from the lower seat cushion 30, but downwardly from the bottom surface of the seat cushion body 27. Further, the sensor supporting protrusions 36 may be protruded from both of the lower seat cushion 30 and the seat cushion body 27.

Further, without forming the separate lower seat cushion 30, an accommodating space such as a slit or the like may be formed in a vertically intermediate portion of the seat cushion body 27, and the seat switch 25 may be accommodated in this accommodating space. Still further, when, as the seat skin 28, a known wadding structure which overlaps a relatively thin and soft thin layer cushion to the lower portion of the topcoat 45 besides the topcoat 45 is adopted, the seat switch 25 may be arranged between the thin layer cushion of the wadding and the seat cushion body 27. Additionally, the seat switch 25 is not limited to the illustrated type, and known various types can be available so long as they adopt the pressure sensitive method. Still additionally, the seat switch 25 is applicable to astride-type seats of various kinds of vehicles including an auto three-wheeled and a four-wheeled vehicle besides the motorcycle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A combination of a riding detection device and a motorcycle seat, comprising:

a seat bottom plate;

a seat cushion, formed of a sponge-like material, mounted on said seat bottom plate;

a seat skin covering a surface of said seat cushion; and a riding detection sensor arranged at an intermediate portion within said sponge-like material of said seat cushion, wherein said riding detection sensor is arranged so as to be extended in the frontward and rearward direction at a central portion in the widthwise direction of said seat, and said riding detection sensor has a portion thereof disposed forwardly of a hip point of a rider on said seat.

2. The combination according to claim 1, wherein sensor supporting protrusions are formed on a portion of said seat cushion for supporting said riding detection sensor, and said riding detection sensor is supported on said sensor supporting protrusions.

3. A motorcycle seat, comprising:

a bottom plate;

an upper seat cushion mounted on said bottom plate, said upper seat cushion having a recess in a lower side thereof;

a lower seat cushion located within said recess in said upper seat cushion; and a riding detection sensor located between said upper seat cushion and said lower seat cushion.

4. The seat according to claim 3, wherein said bottom plate includes a plurality of ribs extending downwardly therefrom.

5. The seat according to claim 4, wherein said ribs extend perpendicular to a central longitudinal axis of said seat.

6. The seat according to claim 3, wherein said lower seat cushion includes a substantially rectangular main portion, and an overhanging portion located along one side of said main portion, so that said lower seat cushion has an L-shape.

7. The seat according to claim 6, wherein said main portion includes a plurality of protrusions extending upwardly from a surface of said main portion.

8. The seat according to claim 7, wherein said riding detection sensor comprises a plurality of sensor bodies located on said plurality of protrusions.

9. The seat according to claim 6, wherein said overhanging portion includes a recess therein for receiving a connector of said riding detection sensor.

10. The seat according to claim 3, wherein said riding detection sensor comprises a plurality of sensor bodies.

11. The seat according to claim 10, wherein said sensor bodies are arranged in a matrix.

12. The seat according to claim 11, wherein said matrix has at least two rows of said sensor bodies.

13. The seat according to claim 12, wherein said two rows are spaced apart on opposite sides of a central longitudinal axis of said seat.

14. The seat according to claim 13, wherein said lower seat cushion includes a substantially rectangular main portion, and an overhanging portion located along one side of said main portion, so that said lower seat cushion has an L-shape.

15. The seat according to claim 14, wherein said main portion includes a plurality of protrusions extending upwardly from a surface of said main portion.

16. The seat according to claim 15, wherein said plurality of sensor bodies are located on said plurality of protrusions.

17. The seat according to claim 3, wherein said upper seat cushion and said lower seat cushion are made of polyurethane foam.

18. The seat according to claim 3, wherein said upper seat cushion is formed of a sponge-like material, and wherein said lower seat cushion is formed of a sponge-like material.

19. A motorcycle comprising:
a body having a frame;
a power unit swingably attached to said frame;
a wheel supported by said power unit;
a seat supported on said body, said seat including:
 a bottom plate;
 an upper seat cushion mounted on said bottom plate, said upper seat cushion having a recess in a lower side thereof;
 a lower seat cushion located within said recess in said upper seat cushion; and
 a riding detection sensor located between said upper seat cushion and said lower seat cushion.

20. The motorcycle according to claim 19, wherein said lower seat cushion includes a plurality of protrusions extending upwardly from an upper surface thereof, and said riding detection sensor comprises a plurality of sensor bodies located on said plurality of protrusions.

21. The motorcycle according to claim 19, wherein said upper seat cushion is formed of a sponge-like material, and wherein said lower seat cushion is formed of a sponge-like material.

* * * * *